(12) United States Patent
Oda et al.

(10) Patent No.: US 7,077,105 B2
(45) Date of Patent: Jul. 18, 2006

(54) SPARK IGNITION INTERNAL COMBUSTION ENGINE

(75) Inventors: Tomihisa Oda, Numazu (JP); Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/560,133

(22) PCT Filed: Jun. 4, 2004

(86) PCT No.: PCT/IB2004/001829

§ 371 (c)(1),
(2), (4) Date: Dec. 9, 2005

(87) PCT Pub. No.: WO2004/111416

PCT Pub. Date: Dec. 23, 2004

(65) Prior Publication Data

US 2006/0118085 A1    Jun. 8, 2006

(30) Foreign Application Priority Data

Jun. 12, 2003   (JP) ............................. 2003-167952

(51) Int. Cl.
*F02P 5/152* (2006.01)
*G06F 17/00* (2006.01)
(52) U.S. Cl. .................... 123/406.3; 123/304; 123/431
(58) Field of Classification Search ..............
123/406.29–406.3, 304–305, 1 A, 27 GE,
123/525, 431, 575
See application file for complete search history.

(56) References Cited

U.S. PATENT DOCUMENTS

| | | | |
|---|---|---|---|
| 3,503,722 A | 3/1970 | Weber et al. | |
| 5,012,782 A * | 5/1991 | Tokuda | 123/406.3 |
| 5,109,821 A | 5/1992 | Yoshida et al. | |
| 6,951,202 B1 * | 10/2005 | Oda | 123/406.29 |
| 6,990,955 B1 * | 1/2006 | Niimi | 123/406.3 |
| 2002/0139111 A1 | 10/2002 | Ueda et al. | |

FOREIGN PATENT DOCUMENTS

| | | |
|---|---|---|
| GB | 528350 | 10/1940 |
| JP | 4-234571 | * 8/1992 |
| JP | A 04-234571 | 8/1992 |
| JP | A 07-293346 | 11/1995 |
| JP | WO 99/06683 | 2/1999 |
| JP | A 2000-179368 | 6/2000 |

(Continued)

*Primary Examiner*—Hai Huynh
(74) *Attorney, Agent, or Firm*—Oliff & Berridge, PLC

(57) ABSTRACT

A low-octane fuel and a high-octane fuel stored in a low-octane fuel tank (5) and a high-octane fuel tank (7), both having known octane numbers, are injected from fuel injection valves (13a, 13b) into an intake port (12) at a mixing proportion that achieves a standard octane number set in accordance with the engine operation state. If knocking occurs during a predetermined steady engine operation state, the knocking is detected by a knock sensor (10b) and, corresponding to the knocking, the ignition timing is retarded from a basic ignition timing. A deviation in octane number is determined from the amount of ignition timing retardation with reference to a map, and is then corrected by the intake air pressure. On the basis of the corrected deviation in octane number, a deviation in the mixing proportion of the high-octane fuel is determined with reference to a map. The thus-determined deviation is added to a target mixing proportion computed corresponding to the standard octane number, thereby computing the present mixing proportion.

14 Claims, 16 Drawing Sheets

FOREIGN PATENT DOCUMENTS

| | | |
|---|---|---|
| JP | A 2000-329013 | 11/2000 |
| JP | A 2001-050070 | 2/2001 |
| JP | A 2001-193525 | 7/2001 |
| JP | A 2001-512208 | 8/2001 |

* cited by examiner

TARGET OCTANE NUMBER CORRESPONDING TO OPERATION STATE

CHANGE IN OCTANE NUMBER WITH MIXING PROPORTION

MRON = LRON × RLRON + HRON × RHRON

OCTANE NUMBER

TOTAL FUEL INJECTION QUANTITY CORRESPONDING TO OPERATION STATE

BASIC IGNITION TIMING CORRESPONDING TO OPERATION STATE

IGNITION TIMING RETARDATION BY KNOCK CONTROL AND DEVIATION IN OCTANE NUMBER

INTAKE TEMPERATURE-BASED CORRECTION VALUE FOR OCTANE NUMBER DEVIATION

SPARK IGNITION INTERNAL COMBUSTION ENGINE

BACKGROUND OF THE INVENTION

1. Field of the Invention

The invention relates to a spark ignition internal combustion engine in which a high-octane fuel and a low-octane fuel are mixed by a fuel mixture means adapted for mixing high and low-octane fuels at variable mixing ratios and a mixed fuel is supplied into a combustion chamber.

2. Description of the Related Art

Low-octane fuels are good in ignitability but poor in antiknock property, whereas high-octane fuels are poor in ignitability but good in antiknock property. Internal combustion engines in which a low-octane fuel and a high-octane fuel are mixed and supplied to an engine by fuel injection valves so as to meet an operating condition of the engine are known, as described in Japanese Patent Application Laid-Open Publication No. 2001-050070.

In such an internal combustion engine, however, the octane number of a mixed fuel supplied into the combustion chamber sometimes deviates from a target octane number due to the tolerance of a mixing device of the fuel injection valve or the like, although the high-octane fuel and the low-octane fuel respectively have predetermined octane numbers. According to the existing technologies, there is no method for detecting this deviation in octane number. Therefore, if the octane number deviates, the engine is operated with the deviated octane number remaining, and therefore cannot exactly deliver intended operation performance, that is, intended accelerating performance, intended fuel consumption, and intended exhaust emissions.

Therefore, in an apparatus described in Japanese Patent Application Laid-Open Publication No. 4-234571, the octane number of fuel is estimated, and an ignition timing corresponding to the estimated octane number is set so that the engine can always operate at a knocking limit. However, the apparatus described in Japanese Patent Application Laid-Open Publication No. 4-234571 merely performs a generally-termed symptomatic treatment in which a deviation in the octane number of fuel is met by adjustment in the ignition timing, and does not provide a radical cure in which the octane number of fuel is set to a predetermined value. That is, since the mixing proportion is not determined, the apparatus is not able to eliminate deviation in the mixing proportion. In the case of a large deviation in the mixing proportion, the apparatus may be incapable of achieving a practical effect.

SUMMARY OF THE INVENTION

It is an object of the invention to provide a spark ignition internal combustion engine in which a high-octane fuel and a low-octane fuel are mixed and supplied to the engine, and the mixing proportion between the high-octane fuel and the low-octane fuel in the mixed fuel can be determined.

In accordance with a first aspect of the invention, a spark ignition internal combustion engine in which a high-octane fuel and a low-octane fuel are mixed so that a mixing proportion is variable by fuel mixture means and a mixed fuel is supplied into a combustion chamber, is characterized in that a standard octane number is set in accordance with an operation state of the spark ignition internal combustion engine, and a first mixing proportion between the high-octane fuel and the low-octane fuel is adjusted so as to achieve the standard octane number, and a reference ignition timing corresponding to the standard octane number is set, and knocking measurement means and mixing proportion estimation means are provided in the spark ignition internal combustion engine, and the knocking measurement means measures a state of occurrence of knocking during a predetermined operation state of the spark ignition internal combustion engine, and the mixing proportion estimation means determines a deviation value between a second mixing proportion between the high-octane fuel and the low-octane fuel really supplied into the combustion chamber and the first mixing proportion, the deviation value being set based on the measured state of occurrence of knocking, and estimates the second mixing proportion between the high-octane fuel and the low-octane fuel based on the deviation value.

In the first aspect of the invention, the high-octane fuel and the low-octane fuel are mixed at a variable mixing proportion and supplied into a combustion chamber by the fuel mixture means. A standard octane number is set in accordance with the operation state, and the mixing proportion between the high-octane fuel and the low-octane fuel is adjusted so as to achieve the standard octane number, and a reference ignition timing corresponding to the standard octane number is set. The state of occurrence of knocking during a predetermined operation state is measured. On the basis of the measured state of occurrence of knocking, a deviation from the set mixing proportion is determined, and a mixing proportion between the low-octane fuel and the high-octane fuel is estimated. Therefore, it becomes possible to easily estimate the mixing proportion between the low-octane fuel and the high-octane fuel.

In the first aspect of the invention, if the second mixing proportion is different from the first mixing proportion, an amount of the high-octane fuel and/or an amount of the low-octane fuel supplied into the combustion chamber are/is changed so that the second mixing proportion becomes substantially equal to the first mixing proportion.

In the first aspect or a form related thereto, if knocking does not occur during the predetermined operation state, the ignition timing may be advanced. Therefore, the engine can be operated in a region of a higher efficiency, so that the fuel economy and the engine output will improve.

In the first aspect or a form related thereto, if knocking occurs during the predetermined operation state, a proportion of the high-octane fuel may be increased. Therefore, recurrence of knocking can be curbed.

In the first aspect or a form related thereto, the knocking measurement means executes a knock control of retarding the ignition timing in accordance with a strength of knocking when knocking occurs, and the mixing proportion estimation means estimates the second mixing proportion based on an amount of retardation of the ignition timing caused by the knock control.

In the first aspect or a form related thereto, the amount of retardation of the ignition timing caused by the knock control may be corrected by an intake air temperature. Therefore, the influence of the intake air temperature is eliminated, so that the precision in estimation of the mixing proportion becomes good.

In the first aspect or a form related thereto, the fuel mixture means may mix the high-octane fuel and the low-octane fuel so as to achieve the standard octane number based on a known nominal octane number of the high-octane fuel and a known nominal octane number of the low-octane fuel.

In the first aspect or a form related thereto, the spark ignition internal combustion engine may further comprise actual octane number detection means adapted for detecting an actual octane number of the low-octane fuel and an actual octane number of the high-octane fuel, wherein the fuel mixture means sets a third mixing proportion between the high-octane fuel and the low-octane fuel in accordance with the operation state so as to achieve the standard octane number based on the actual octane number of the high-octane fuel detected by the actual octane number detection means and the actual octane number of the low-octane fuel detected by the actual octane number detection means. Therefore, due to the provision of the actual octane number detection means, the actual octane numbers of the low-octane fuel and the high-octane fuel are detected even if the octane numbers of the two fuels are not known beforehand. On the basis of the detected actual octane numbers, the mixing proportion between the high-octane fuel and the low-octane fuel is set so as to achieve the standard octane number. Then, the state of occurrence of knocking during the predetermined operation state is measured by the knocking measurement means. On the basis of the measured state of occurrence of knocking, the mixing proportion estimation means determines a deviation from the set mixing proportion as described above, and thereby estimates the mixing proportion between the low-octane fuel and the high-octane fuel.

In the first aspect or a form related thereto, the actual octane number detection means may set a proportion of the low-octane fuel at 100% to measure the state of occurrence of knocking during the predetermined operation state, and may determine the actual octane number of the low-octane fuel based on the measured state of occurrence of knocking, and may mix the low-octane fuel whose actual octane number has been determined with the high-octane fuel at a predetermined proportion, and may measure the state of occurrence of knocking during the predetermined operation state, and may determine the actual octane number of the high-octane fuel based on the measured state of occurrence of knocking.

In the first aspect or a form related thereto, the spark ignition internal combustion engine may further comprise a fuel separator device that separates a fuel into the high-octane fuel and the low-octane fuel, wherein the mixing proportion estimation means determines whether the fuel separator device is normally operating so as to separate the fuel into the high-octane fuel having a predetermined octane number and the low-octane fuel having a predetermined octane number. Therefore, the high-octane fuel and the low-octane fuel are produced from a fuel through separation by the fuel separator device. Furthermore, it can be determined by the mixing proportion estimation means whether the fuel separator device is normally operating so as to separate the fuel into the high-octane fuel having a predetermined octane number and the low-octane fuel having a predetermined octane number.

In the first aspect or a form related thereto, in the fuel separator device, a fourth mixing proportion in accordance with the operation state is set so as to attain the standard octane number on an assumption that the separated high-octane fuel and the separated low-octane fuel have the predetermined octane numbers, and the mixing proportion estimation means determines that an operation of the fuel separator device is abnormal if the deviation value between the second mixing proportion determined based on the state of occurrence of knocking and the fourth mixing proportion is greater than a predetermined criterion value.

In accordance with a second aspect of the invention, a method for estimating a mixing proportion between a high-octane fuel and a low-octane fuel which is supplied into a combustion chamber of a spark ignition internal combustion engine, characterized by comprising the steps of: a first step of setting a standard octane number in accordance with an operation state of the spark ignition internal combustion engine; a second step of adjusting a first mixing proportion between the high-octane fuel and the low-octane fuel so as to achieve the standard octane number; a third step of setting a reference ignition timing corresponding to the standard octane number; a fourth step of measuring a state of occurrence of knocking during a predetermined operation state; a fifth step of determining a deviation value between a second mixing proportion between the high octane fuel and the low octane fuel really supplied into the combustion chamber and the first mixing proportion, the deviation value being set based on the measured state of occurrence of knocking; and a sixth step of estimating the second mixing proportion between the high-octane fuel and the low-octane fuel based on the deviation value.

DETAILED DESCRIPTION OF THE PREFERRED EMBODIMENTS

Figure 1:
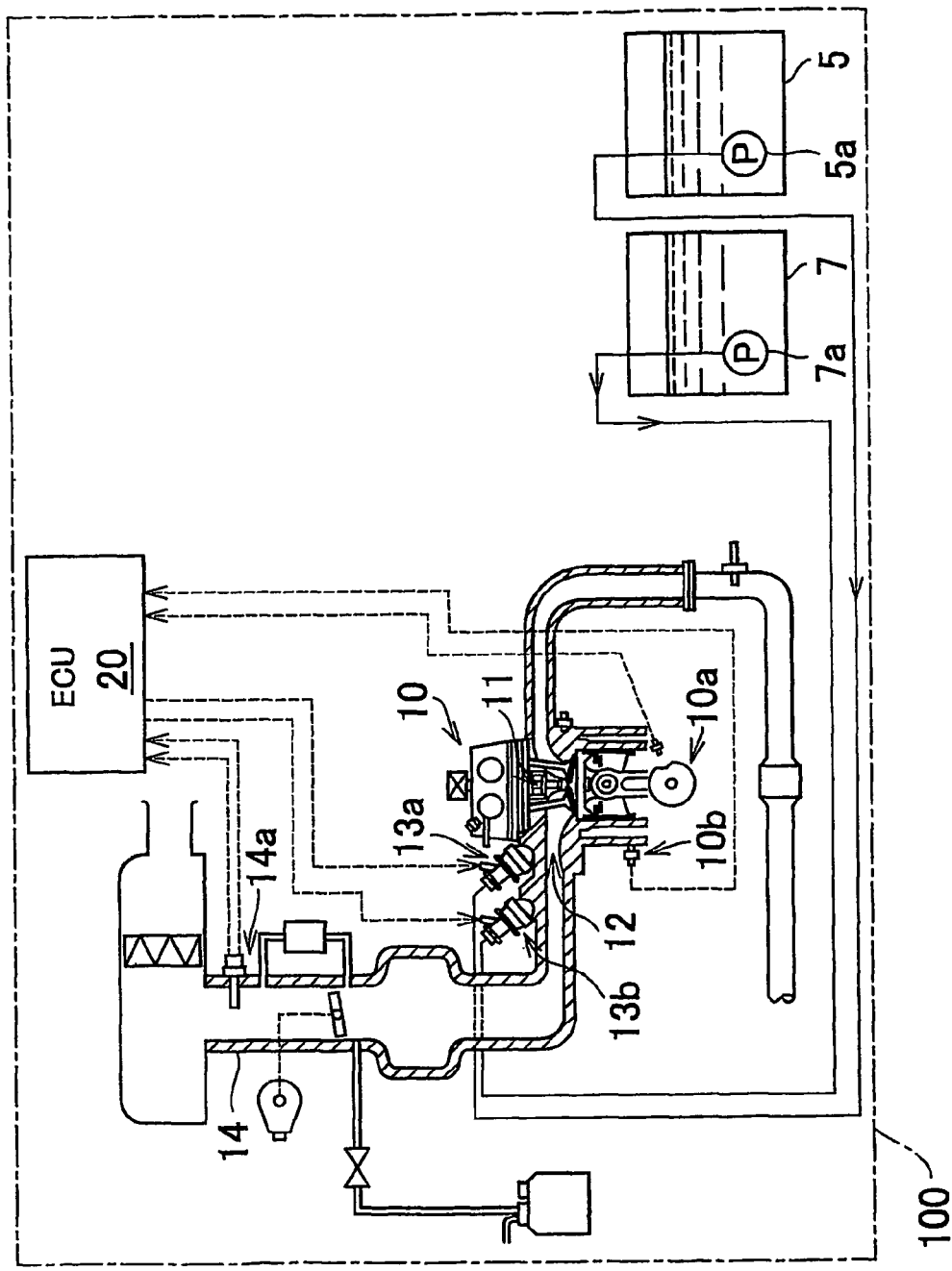
FIG. 1 is a diagram illustrating a construction of a first embodiment and its modifications.

Preferred embodiments of the invention will be described hereinafter with reference to the accompanying drawings. FIG. 1 is a schematic diagram illustrating a construction of a first embodiment. Referring to FIG. 1, a low-octane fuel tank 5 of a vehicle 100 stores a low-octane fuel that has a relatively low octane number, and a high-octane fuel tank 7 stores a high-octane fuel that has a relatively high octane number.

The low-octane fuel and the high-octane fuel are supplied to fuel injection valves 13a, 13b via a low-octane fuel pump 5a and a high-octane fuel pump 7a, respectively. The two fuel injection valves 13a, 13b are attached to an intake port 12 of a spark ignition internal combustion engine (hereinafter, simply referred to as "engine") that has an ignition plug 11. The fuel injection valves 13a, 13b inject into the intake port 12 the low-octane fuel and the high-octane fuel at predetermined proportions suitable for the operating condition in accordance with a command from an electronic control unit (ECU) 20. The injected fuels are mixed in the intake port 12 and a combustion chamber.

Although in this embodiment, the two fuel injection valves 13a, 13b are provided on the intake port 12, it is also possible to provided one of the two injection valves as a fuel injection valve that injects fuel directly into the cylinder, or to provide one fuel injection valve capable of injecting two kinds of fuels into the intake port 12.

The engine 10 is provided with a crank angle sensor 10a for detecting the engine revolution speed, and a knock sensor 10b for measuring the state of occurrence of knocking. Furthermore, an intake pipe 14 is provided with an air flow meter 14a for detecting the amount of intake air as a load. The air flow meter 14a has a built-in intake air temperature sensor for detecting the temperature of intake air. Values detected by these sensors and meter are sent to the ECU 20. Various other sensors and the like send signals to the ECU 20, and the ECU 20 sends signals to many control devices and the like. However, sensors, devices and the like that are not directly relevant to the invention are omitted from the illustration of the drawings.

If the knock sensor 10b detects knocking, the ECU 20 retards the ignition timing of the ignition plug 11 so that knocking does not occur. This control will be hereinafter referred to as "knock control".

Figure 11:
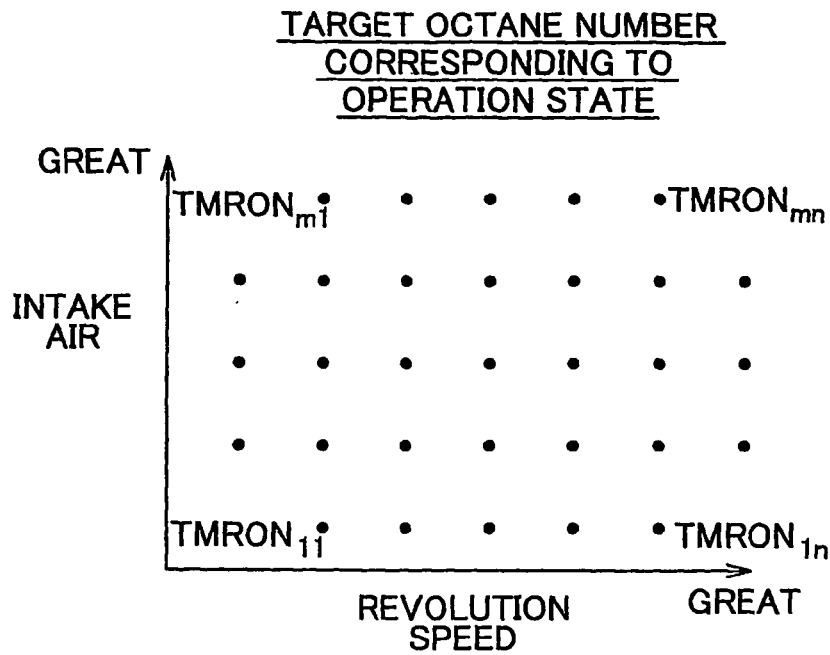
FIG. 11 is a map that indicates a target octane number corresponding to the condition of operation.

In this embodiment, an octane number of a mixed fuel formed by the fuel injection valves 13a, 13b which is to be employed for the operating condition determined by the amount of intake air and the revolution speed, that is, a target mixed fuel octane number TMRON, is set. FIG. 11 shows a map of the target mixed fuel octane number TMRON. In the map, the mixed fuel octane number TMRON is set low for low loads, and is set high for high loads.

Figure 12:
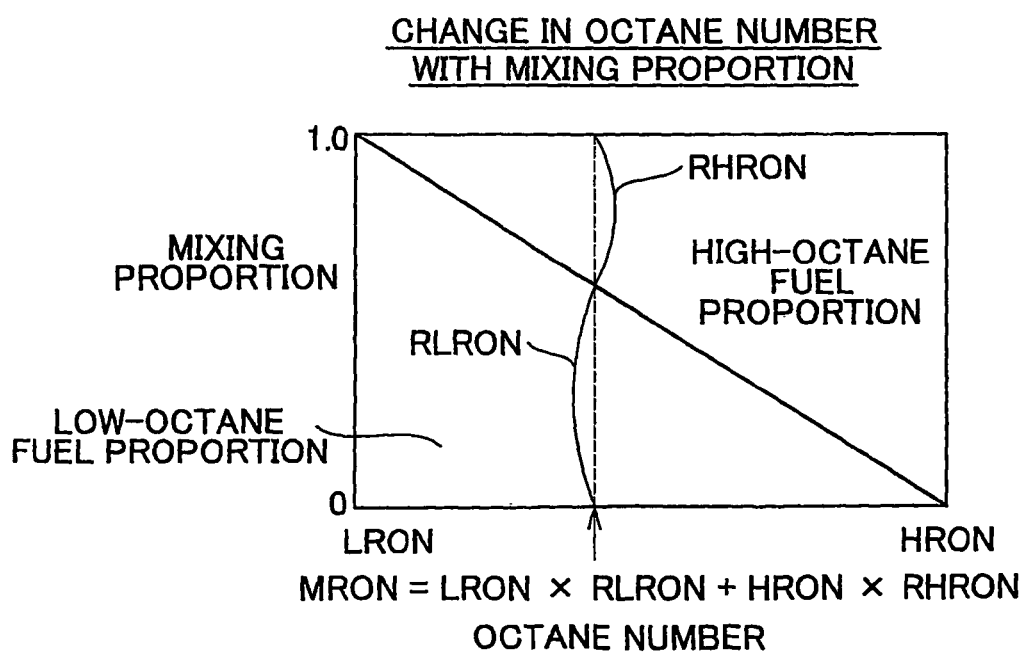
FIG. 12 is a diagram illustrating changes in the octane number depending on the mixing proportion between the low-octane fuel and the high-octane fuel.

FIG. 12 is a diagram illustrating mixture of the low-octane fuel and the high-octane fuel performed by the fuel injection valves 13a, 13b in order to achieve the mixed fuel octane number MRON set as mentioned above. For example, the mixed fuel octane number MRON of a mixture formed by mixing a low-octane fuel having an octane number LRON at a proportion RLRON and a high-octane fuel having an octane number HRON at a proportion RHRON (RLRON+RHRON=1) is given as in MRON RLRON×LRON-RHRON×HRON.

By rewriting this, the following equations are given. Proportion of high-octane fuel RHRON=(MRON−(RLRON×LRON))/HRON Proportion of low-octane fuel RLRON=(MRON−(RHRON×HRON))/LRON The first embodiment adopts known nominal octane numbers set as the low-octane fuel's octane number LRON and the high-octane fuel's octane number HRON.

Figure 3:
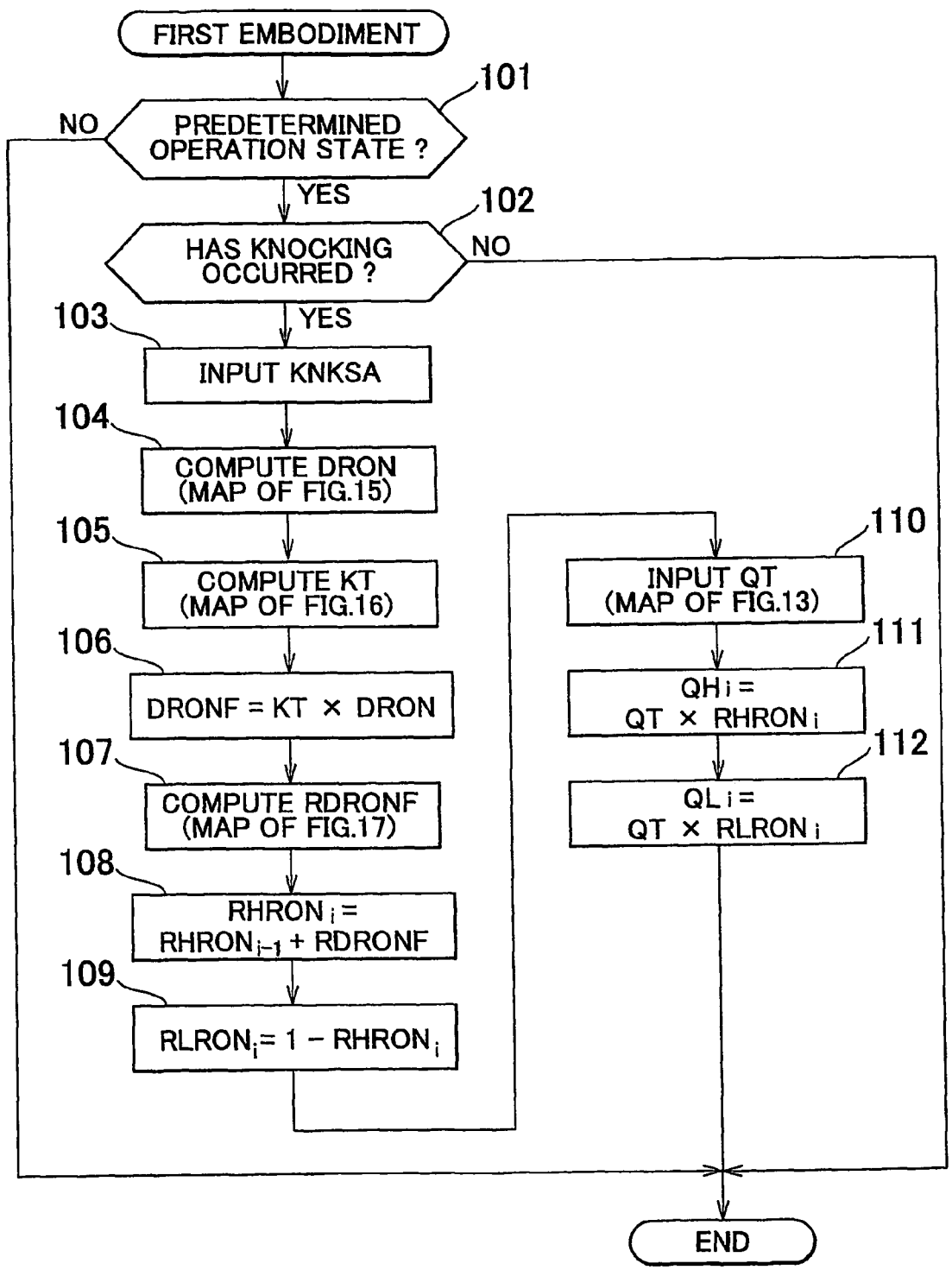
FIG. 3 is a flowchart illustrating a control in the first embodiment.
Figure 14:
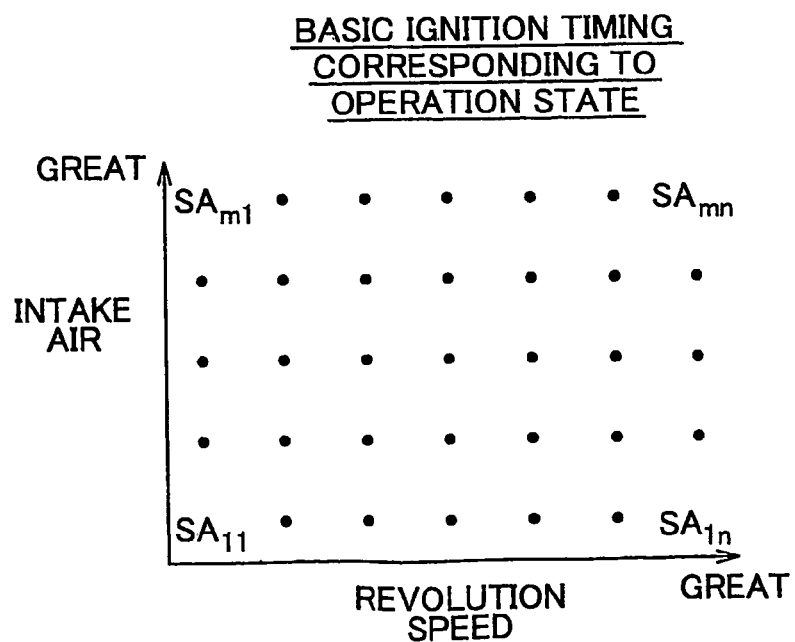
FIG. 14 is a map that indicates a basic ignition timing corresponding to the operation condition.

FIG. 3 is a map indicating the total quantity of injection QT of a mixed fuel having a mixed fuel octane number MRON as mentioned above, corresponding to the engine operating condition. FIG. 14 is a diagram illustrating the basic ignition timing employed in the operation based on a fuel having a mixed fuel octane number MRON set as indicated in FIG. 11. The basic ignition timing is set so as to produce as great torque as possible while avoiding occurrence of knocking provided that mixed fuel octane numbers MRON are given as predetermined for various operating conditions. That is, the basic ignition timing is set at MBT (minimum advance for best torque) if this setting is allowed. In regions where the setting at the MBT raises the possibility of occurrence of knocking, the basic ignition timing is set on the retarded side of the MBT.

However, due to the manufacturing errors of the fuel injection valves 13a, 13b or the like, there are cases where the mixed fuel octane number MRON predetermined for the operating condition is not injected. Therefore, in this embodiment, if knocking occurs during a certain operating state, for example, a steady operating state of about 50 km/h, the deviation of the actual mixed fuel octane number from a target octane number is determined from the situation of occurrence of the knocking, and the deviation is corrected by the intake air temperature, and then is used to compute a correction amount for the mixing proportion. Then, the correction amount is added to the present mixing proportion to determine a mixing proportion.

FIG. 3 is a flowchart illustrating a process of executing a control in accordance with the first embodiment. First, it is determined in step 101 whether the present operation state is a predetermined steady operation state. If the result of determination is negative, the process immediately ends. If the result of determination is affirmative, the process proceeds to step 102, in which it is determined whether knocking has occurred, from the operation of the knock sensor 10b, more specifically, on the basis of whether the knock sensor has detected knocking and, on the basis of the detection, the ignition tiring has been retarded. If the result of determination is negative, that is, if knocking has not occurred, the process immediately ends.

Figure 15:
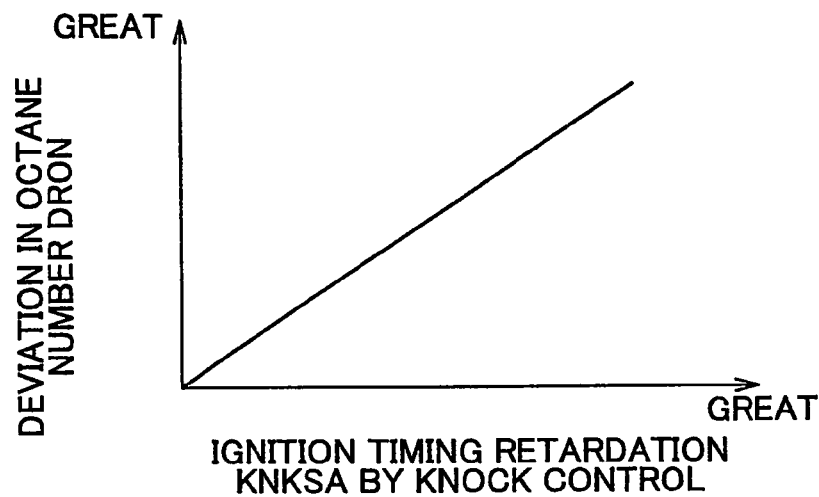
FIG. 15 is a map indicating a relationship between the retardation of the ignition timing by the knock control and the deviation in octane number.

If the result of determination in step 102 is affirmative, that is, if knocking has occurred, the process proceeds to step 103, in which an amount of retardation KNKSA in the ignition timing based on a knock control is input. Subsequently in step 104, a deviation DRON in the octane number of fuel corresponding to the amount of retardation KNKSA of the ignition timing based on the knock control is determined from a pre-stored map as shown in FIG. 15.

Figure 16:
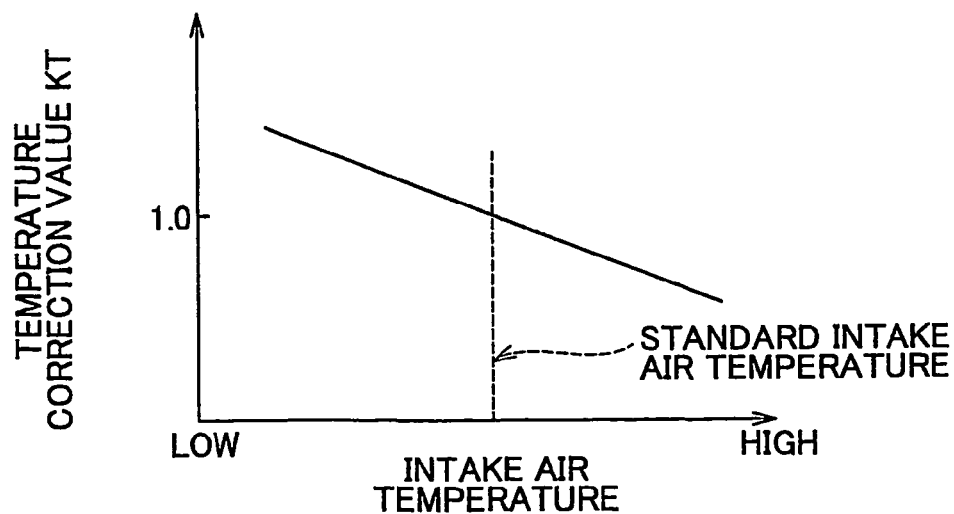
FIG. 16 is a map that indicates an intake air temperature-based correction value for the octane number deviation.
Figure 17:
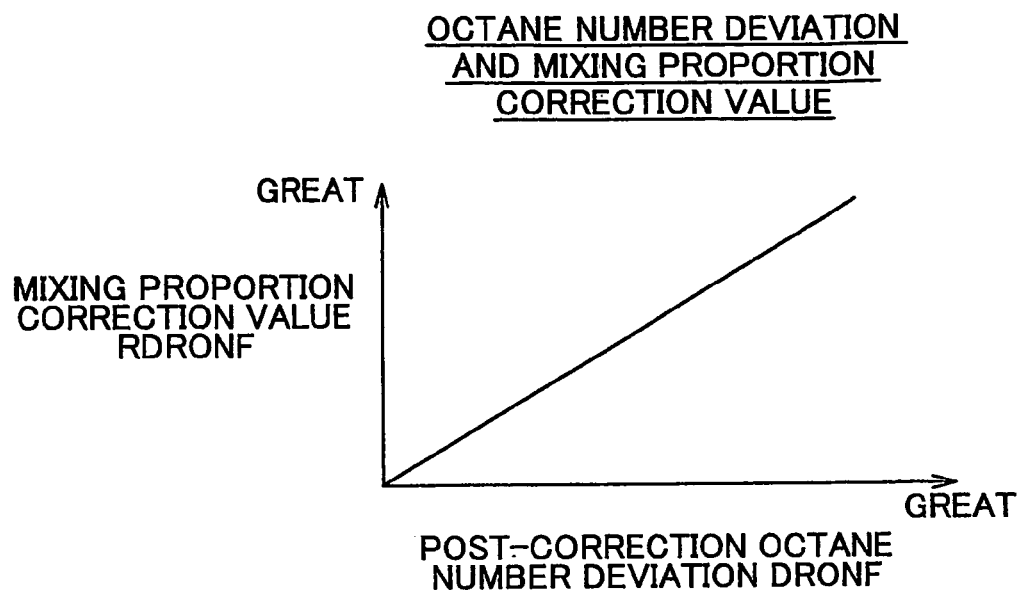
FIG. 17 is a map that indicates the (post-correction) octane number deviation and the mixing proportion correction amount.

Since knocking is affected by the intake air temperature, a temperature correction factor KT for the deviation DRON in octane number is determined in step 105 from a pre-stored map as shown in FIG. 16. Subsequently in step 106, the deviation DRON in octane number is multiplied by the temperature correction factor KT to compute a post-temperature correction deviation DRONF in octane number corresponding to a standard temperature state. Subsequently in step 107, a mixing proportion correction amount RDRONF corresponding to the post-temperature correction octane number deviation DRONF is determined from a map as shown in FIG. 17.

The mixing proportion correction amount RDRONF is a correction amount that is to be used for a present target high-octane fuel proportion RHRONi computed corresponding to the present target octane number TMRON set as in FIG. 11. Subsequently in step 108, the mixing proportion correction amount RDRONF determined in step 107 is added to the present target high-octane fuel proportion RHRONi to determine a new high-octane fuel proportion RHRONi. Subsequently in step 109, the new mixing proportion RHRONi of the high-octane fuel determined in step 108 is subtracted from 1 to determine a new mixing proportion RLRONi of the low-octane fuel.

Figure 13:
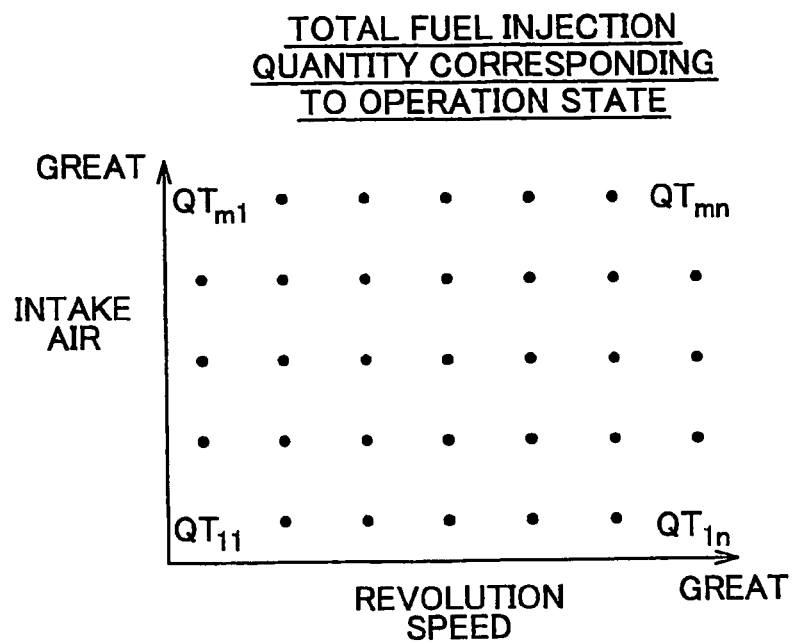
FIG. 13 is a map that indicates a total fuel injection amount corresponding to the operation condition.

Subsequently in step 110, a total fuel injection quantity QT for the present operation state is input from the map indicated in FIG. 13. In steps 111 and 112, the total fuel injection quantity QT input in step 110 is multiplied by the mixing proportion RHRONi of the high-octane fuel and the mixing proportion RLRONi of the low-octane fuel determined in steps 108 and 109, respectively, to determine new injection quantities QHi, QLi of the high-octane fuel and the low-octane fuel.

The first embodiment is constructed, and operates as described above. That is, if knocking occurs in a predetermined steady operation state and the ignition timing is retarded by the knock control, the deviation in octane number is computed from the amount of retardation, and then is corrected so as to offset the influence of the intake air temperature. The thus-corrected octane number deviation is used to compute a deviation in the mixing proportion. On the basis of the computed deviation, the mixing proportions of the high-octane fuel and the low-octane fuel are computed and then corrected to attain target mixing proportions.

A second embodiment will next be described.

Figure 4:
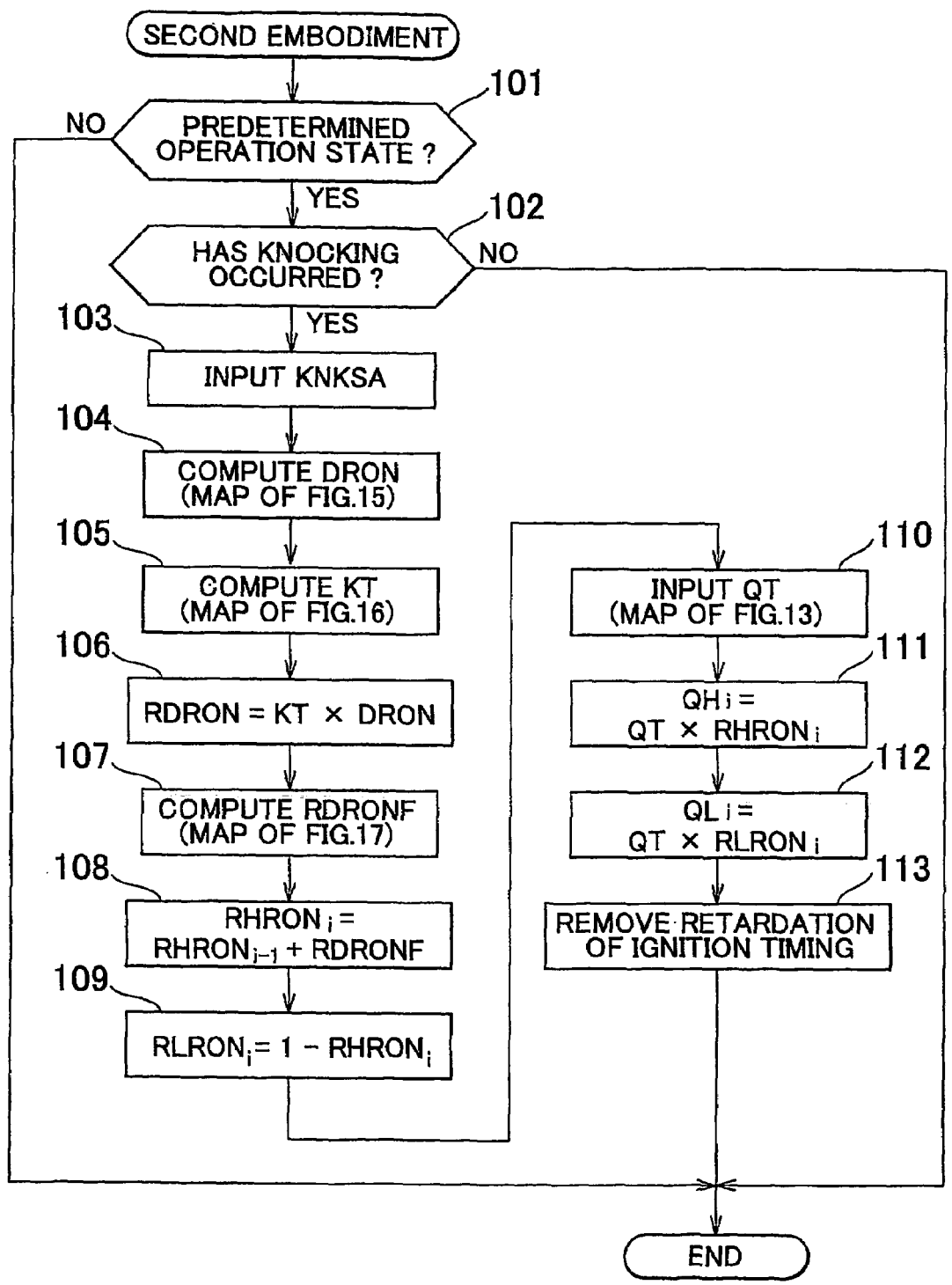
FIG. 4 is a flowchart illustrating a control in a second embodiment.

FIG. 4 is a flowchart illustrating a control of a second embodiment as a first modification of the first embodiment. Steps 101 to 112 are the same as those in the first embodiment. The second embodiment is different from the first embodiment in that step 113 is added, in which the retardation in timing caused by the knock control is removed.

Figure 18:
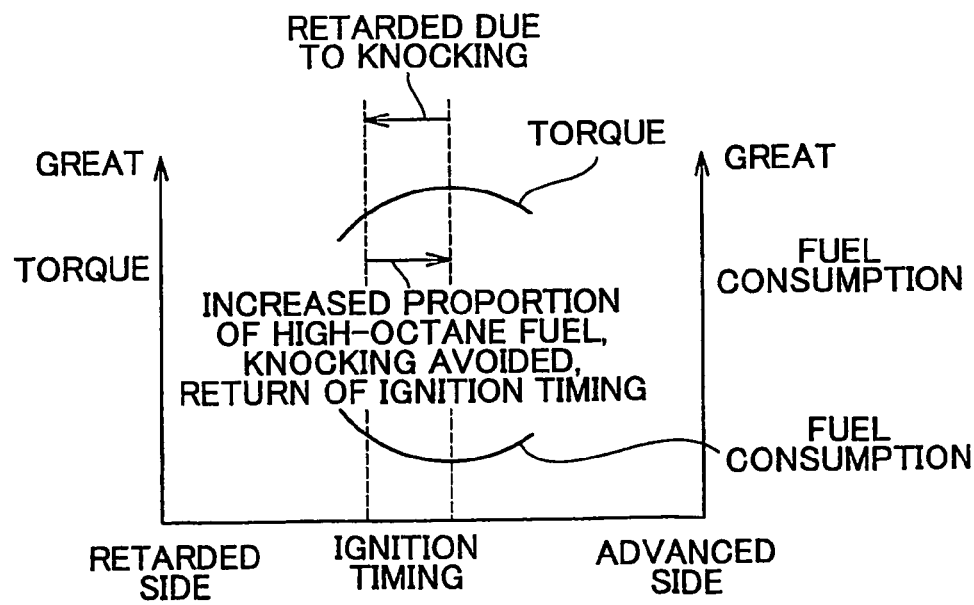
FIG. 18 is a diagram illustrating operation and effect of the second embodiment.

FIG. 18 illustrates concept and effect of a control of the second embodiment. As indicated in FIG. 18, if knocking occurs, the ignition timing is retarded by the knock control. However, the high-octane fuel proportion RHRON is increased, so that occurrence of knocking becomes unlikely and therefore the ignition timing is returned to the original timing. Hence, the fuel consumption reduces (the fuel efficiency improves), and deterioration in fuel economy can be prevented.

Figure 5:
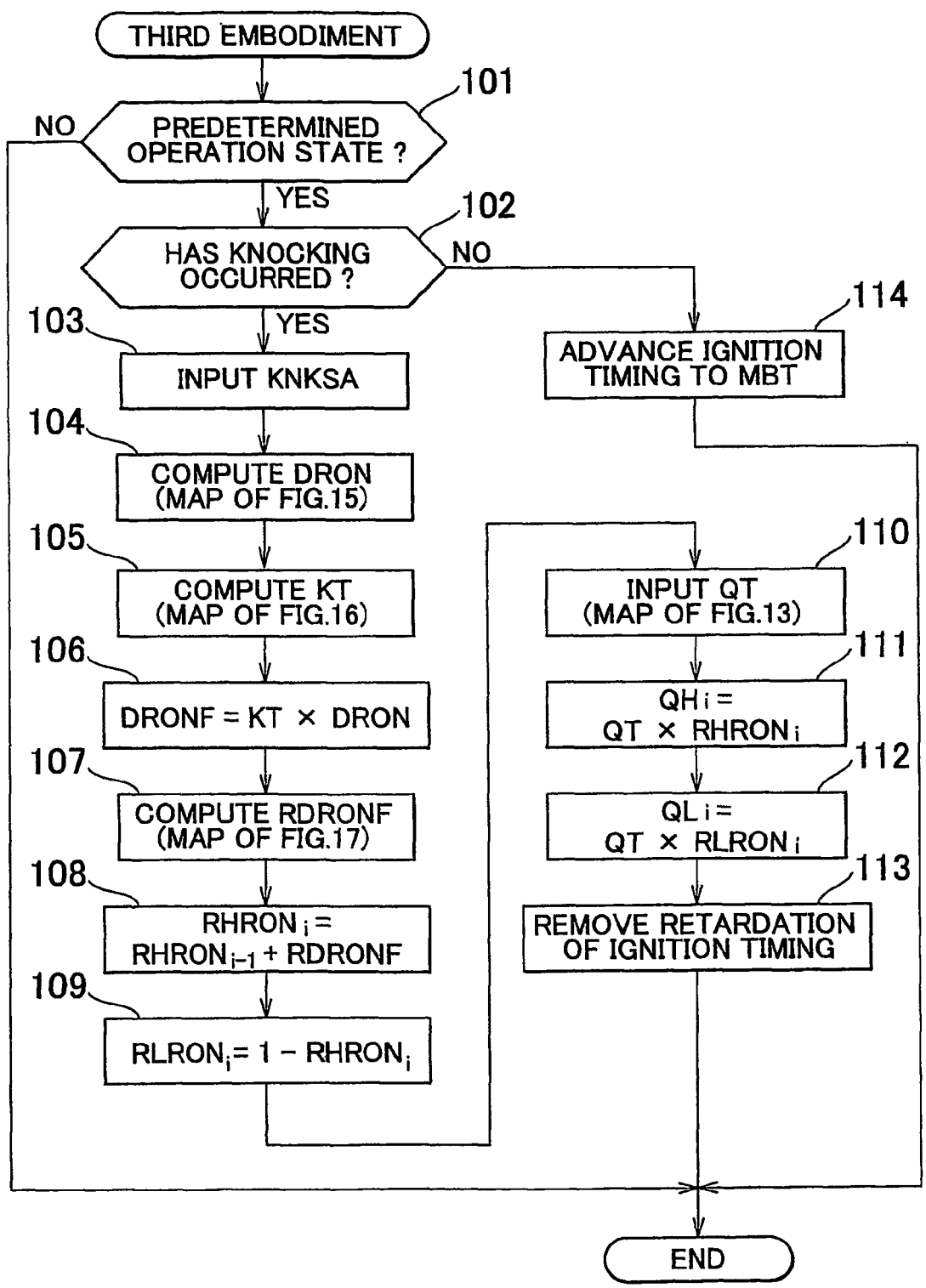
FIG. 5 is a flowchart illustrating a control in a third embodiment.

A third embodiment will next be described. FIG. 5 is a flowchart illustrating a control in accordance with the third embodiment.

Steps 101 to 113 are the same as those in the second embodiment. However, the third embodiment is different from the second embodiment in that step 114 is added, in which the ignition timing is advanced to MBT if a negative determination is made in step 102, that is, if knocking does not occur.

Figure 19:
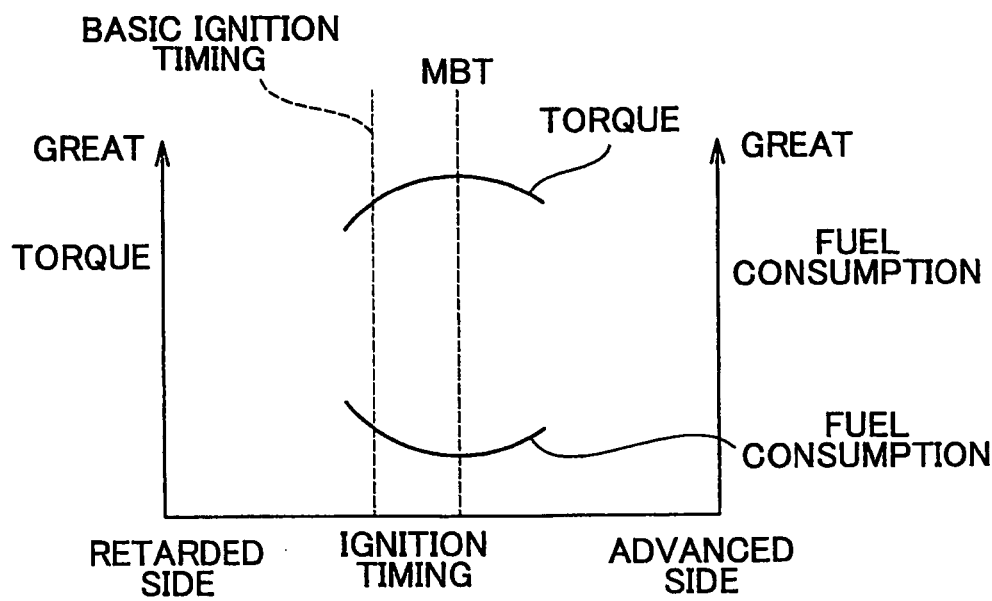
FIG. 19 is a diagram illustrating operation and effect of the third embodiment.

FIG. 19 illustrates concept and effect of the control of the third embodiment. As indicated in FIG. 19, if knocking does not occur, the ignition timing is advanced to MBT, so that the fuel consumption reduces (the fuel efficiency improves) and the fuel economy improves. If the basic ignition timing SA is set at the MBT, there is no effect achieved. However, if the basic ignition timing SA is set at a retarded side of the MBT in order to prevent occurrence of knocking, the ignition timing can be advanced to the MBT. Therefore, the aforementioned effect can be achieved.

Figure 6:
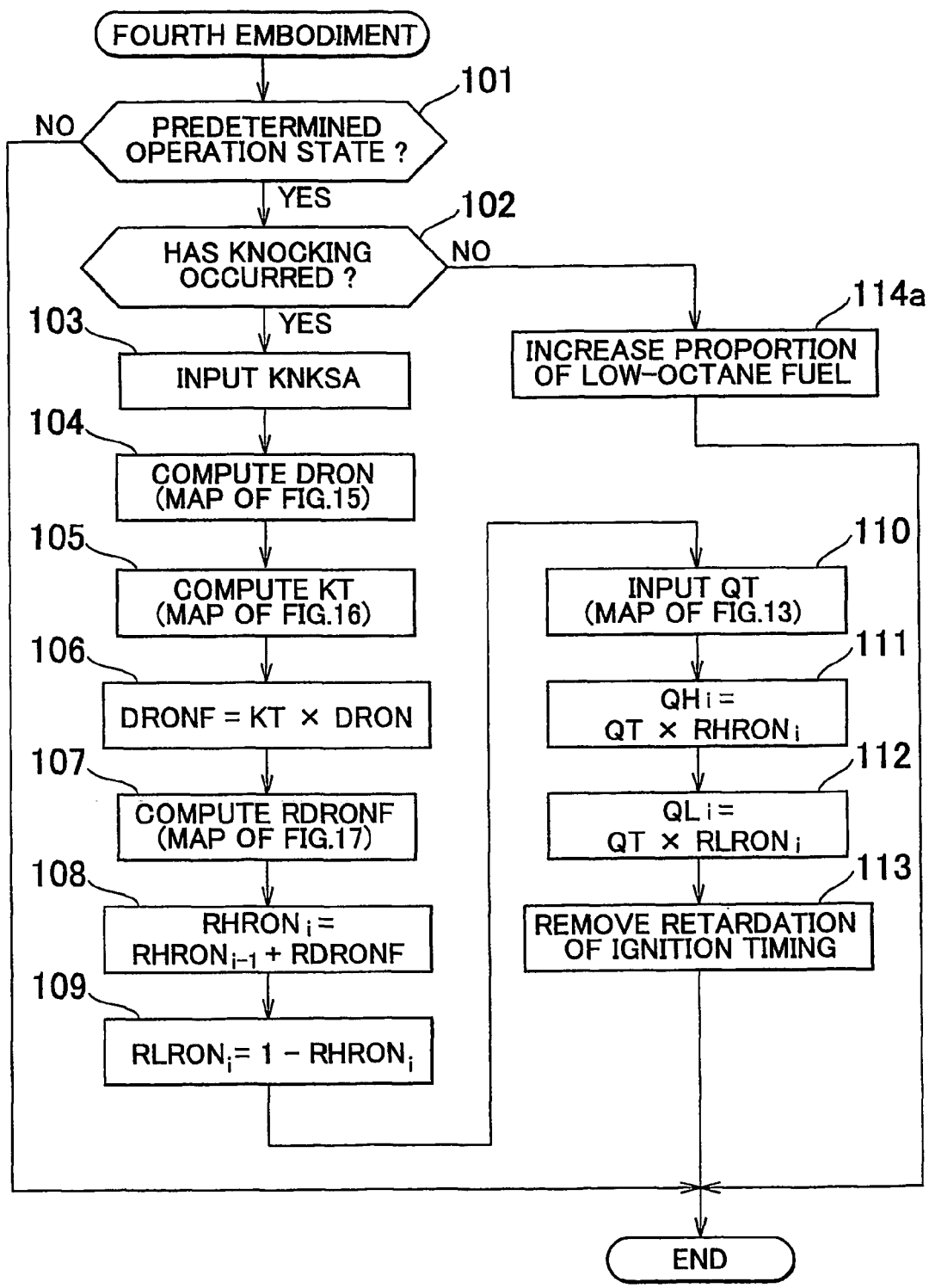
FIG. 6 is a flowchart illustrating a control in a fourth embodiment.

Next, a fourth embodiment will be described. FIG. 6 is a flowchart illustrating a control in accordance with the fourth embodiment. Steps 101 to 113 are the same as those in the second embodiment. However, the fourth embodiment is different from the second embodiment in that step 114a is added. In step 114a, the low-octane fuel proportion is increased if a negative determination is made in step 102, that is, if knocking does not occur.

Figure 20:
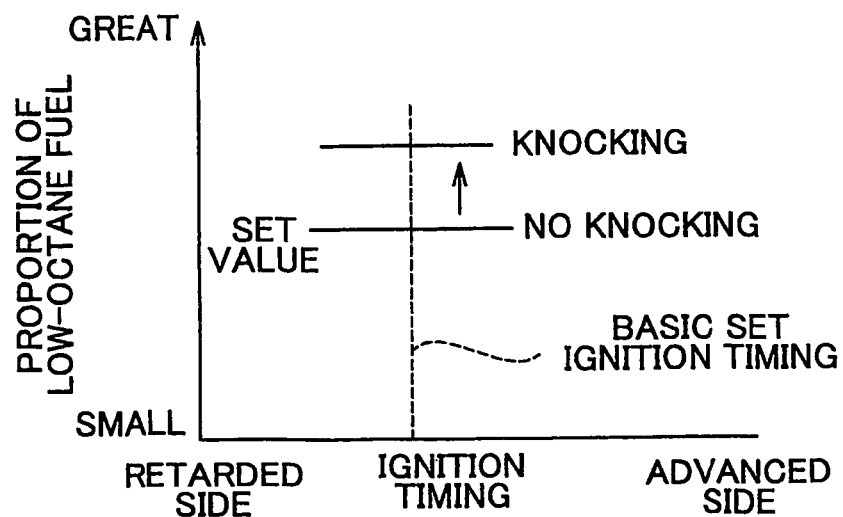
FIG. 20 is a diagram illustrating operation and effect of the fourth embodiment.

FIG. 20 is a diagram illustrating concept of a control in accordance with the fourth embodiment. If knocking does not occur during a predetermined steady operation state, increasing the low-octane fuel proportion will eventually cause knocking. Since increasing the proportion of the low-octane fuel eventually causes knocking, an affirmative determination will be made in step 102, so that execution of steps 103 and 113 will follow, whereby the mixing proportion will be adjusted again to an optimum proportion. Due to the above-described arrangement, the fourth embodiment, that is, the third modification of the first embodiment, prevents a continued use of a fuel having an unnecessarily high octane number.

In the first to fourth embodiments, the mixing proportion between a high-octane fuel and a low-octane fuel is set in accordance with the operation state so as to achieve a standard octane number on the assumption that the high-octane fuel and the low-octane fuel have known nominal octane numbers. However, there are cases where the octane numbers of a high-octane fuel and a low-octane fuel are unknown, or the nominal octane number of a fuel deviates from its actual octane number.

A fifth embodiment copes with these cases. The fifth embodiment will next be described. In the fifth embodiment, the octane numbers of a low-octane fuel and a high-octane fuel that are stored in the low-octane fuel tank 5a and the high-octane fuel tank 7a, respectively, are determined, and a mixing proportion between the two fuels is set on the basis of the determined octane numbers of the fuels. If a deviation from the mixing proportion occurs, the deviated mixing proportion is determined.

Figure 7:
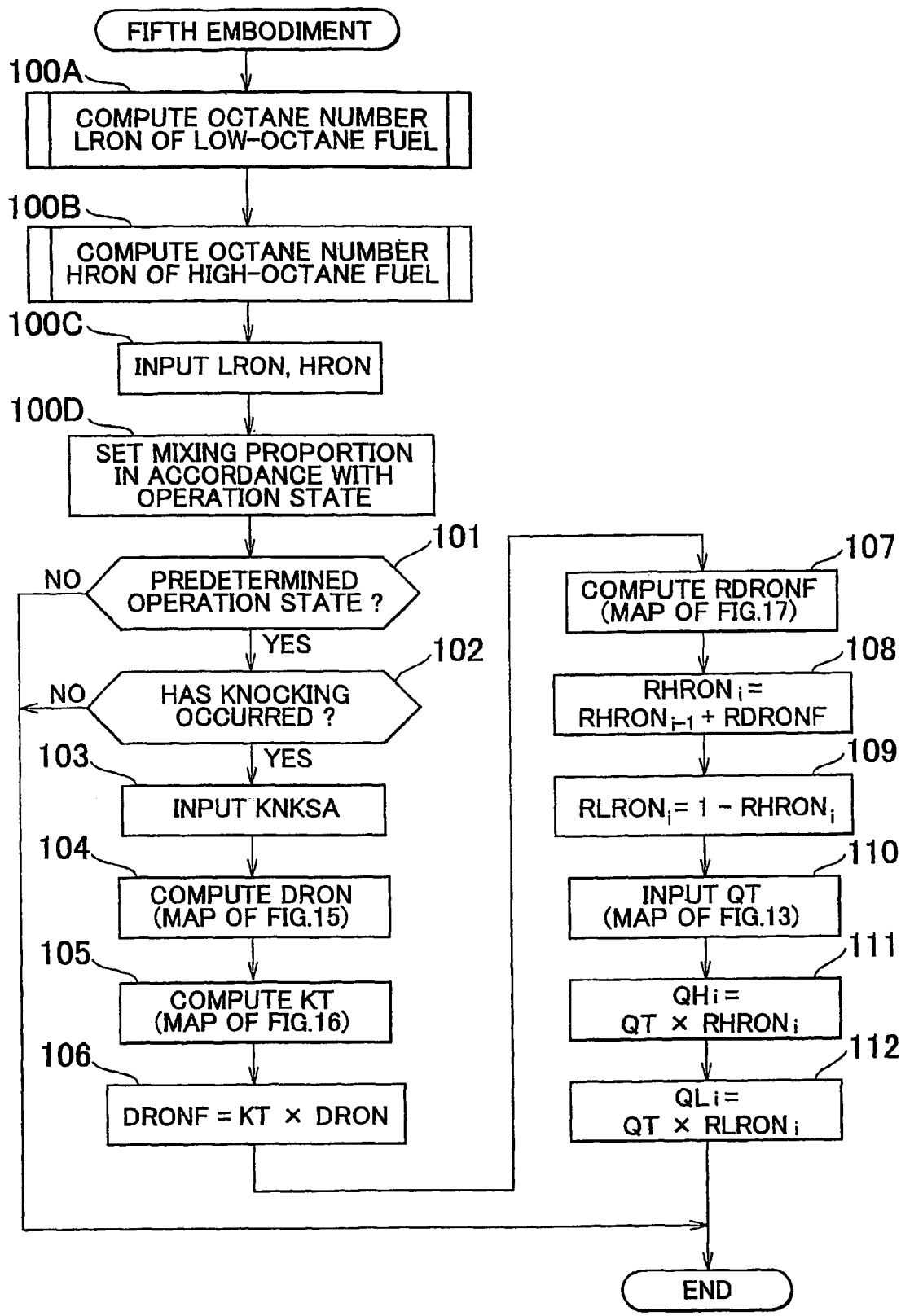
FIG. 7 is a flowchart illustrating a control in a fifth embodiment.

FIG. 7 shows a flowchart illustrating a control in accordance with the fifth embodiment. Steps 101 to 112 are the same as those in the first embodiment. In the fifth embodiment, however, steps 100A to 100D are executed prior to step 101. In step 100A, a low-octane fuel octane number LRON is computed. In step 100B; a high-octane fuel octane number HRON is computed. Subsequently in step 100C, the octane numbers LRON and HRON computed in steps 100A and 100B are input. In step 100D, on the basis of the input LRON and HRON, a mixing proportion corresponding to the operation state is set.

Figure 8:
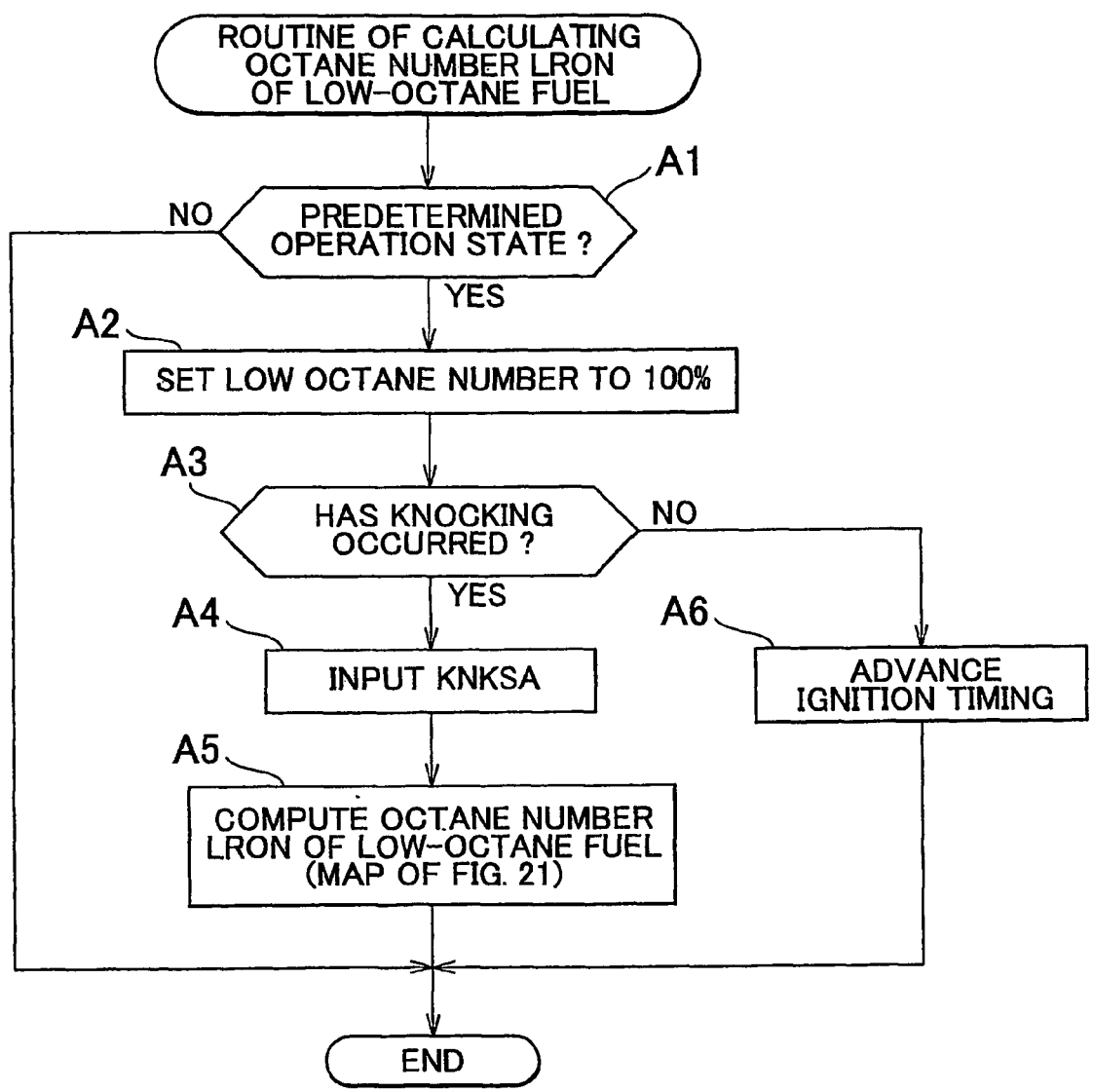
FIG. 8 is a flowchart illustrating a sub-routine of computing the octane number of a low-octane fuel in step 100A in FIG. 7.
Figure 21:
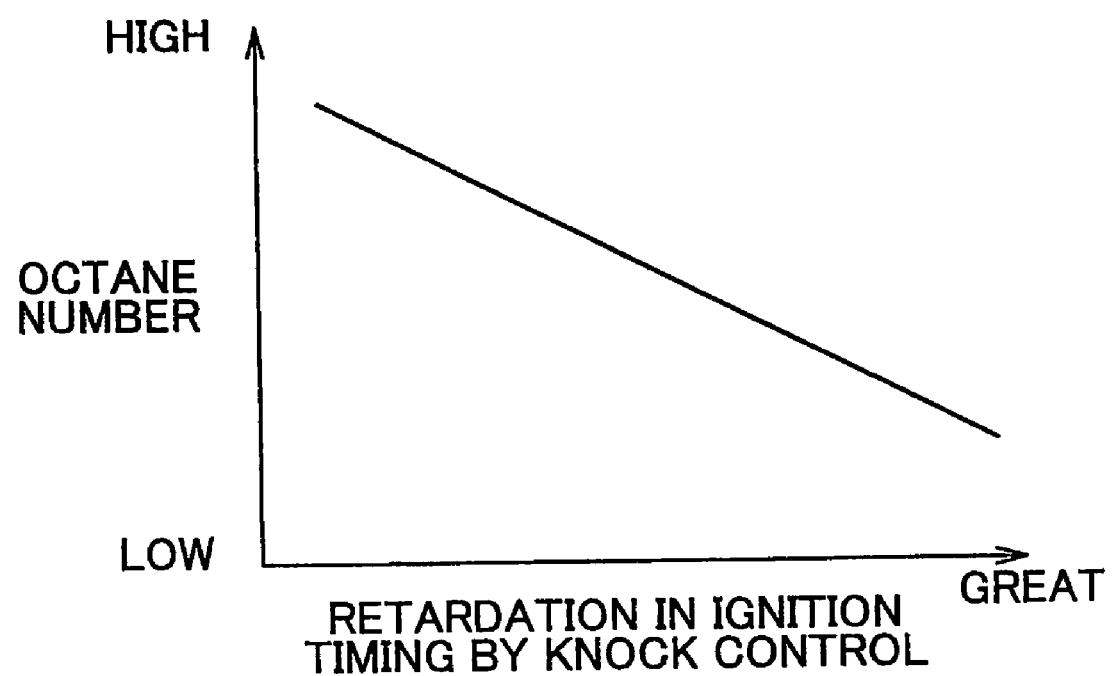
FIG. 21 is a map indicating a relationship between the octane number and the retardation of the ignition timing by the knock control in accordance with the fifth embodiment.

FIG. 8 is a flowchart illustrating a routine executed in step 100A to compute the octane number LRON of the low-octane fuel. If it is determined in step A1 that the present operation state is a predetermined operation state, the process proceeds to step A2, in which the proportion of the low-octane fuel is set to 100%. Then, if it is recognized in step A3 that knocking has occurred, the amount of retardation in ignition timing caused by the knock control in response to the occurrence of knocking is input in step A4. Subsequently in step A5, a low-octane fuel octane number LRON is computed from a map shown in FIG. 21. If the determination in step A2 is negative, the process immediately ends. If occurrence of knocking is not recognized in step A3, the ignition timing is advanced in step A6 so as to cause occurrence of knocking.

Figure 9:
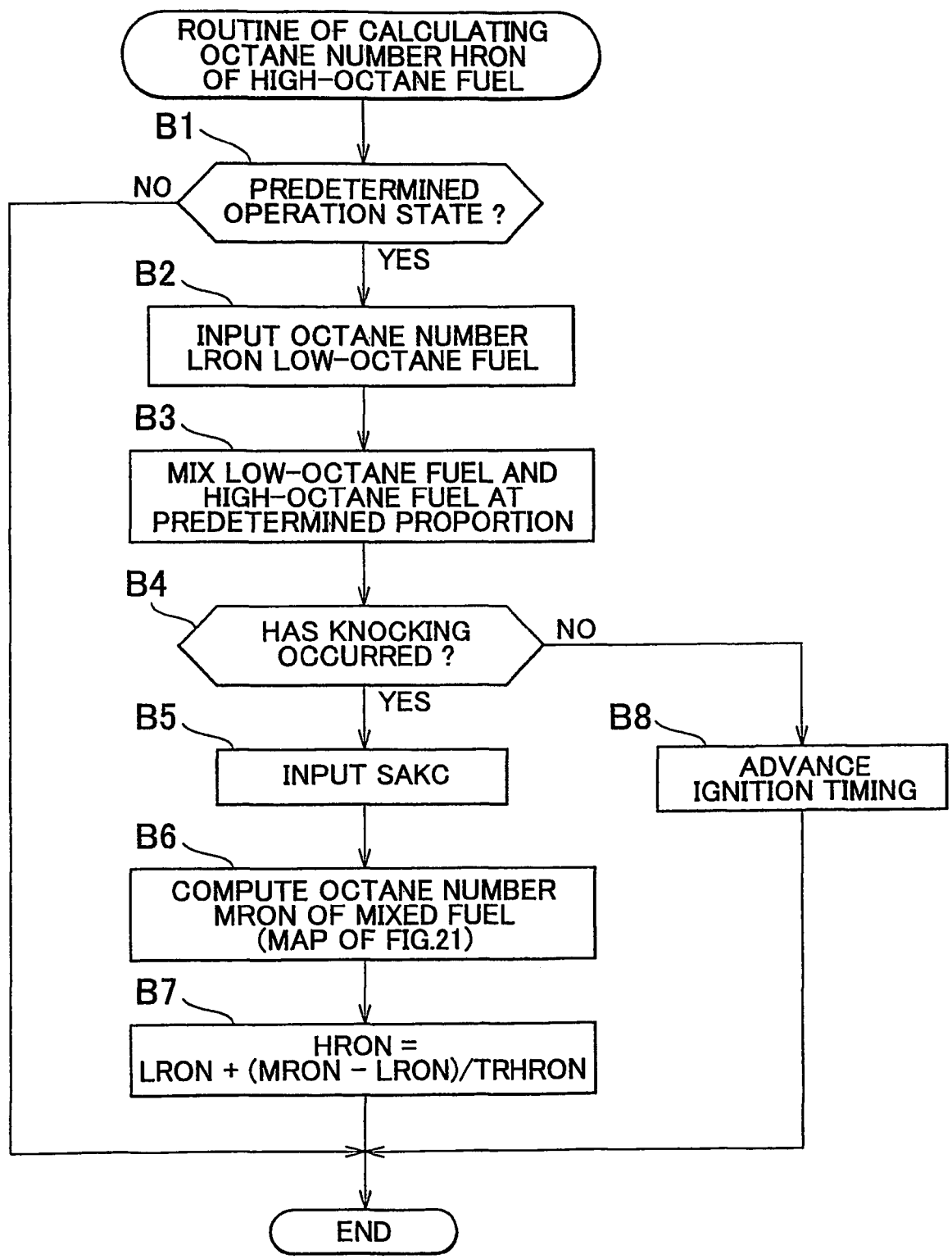
FIG. 9 is a flowchart illustrating a sub-routine of computing the octane number of a high-octane fuel in step 100B in FIG. 7.

FIG. 9 is a flowchart illustrating a routine executed in step 100B to compute the octane number HRON of the high-octane fuel. If it is determined in step B1 that the present operation state is a predetermined operation state, the process proceeds to step B2, in which the low-octane fuel octane number LRON determined as described above is input.

Subsequently in step B3, the low-octane fuel, whose octane number has been found, and the high-octane fuel, whose octane number is unknown, are mixed at a predetermined proportion. It is preferable that the proportion be set so as to provide a mixed fuel that has a relatively low octane number, for example, the low-octane fuel:the high-octane fuel=9:1, and is therefore likely to cause knocking.

Then, if occurrence of knocking is recognized in step B4, the amount of retardation in the ignition timing caused by the knock control in response to the occurrence of knocking is input in step B5. Subsequently in step B6, an octane number MRON of the mixed fuel obtained by mixing the two fuels at the predetermined proportion as described above is computed from the map shown in FIG. 21.

From MRON=HRON×TRHRON+LRON×(1−TRHRON) where TRHRON is the proportion of the high-octane fuel, HRON=LRON+(MRON−LRON)/TRHRON holds. On the basis of the equation HRON=LRON+(MRON−LRON)/TRHRON, the octane number HRON of the high-octane fuel is determined in step B7. If the determination in step B1 is negative, the process immediately ends. If occurrence of knocking is not recognized in step B4, the ignition timing is advanced in step B4 so as to cause occurrence of knocking.

The fifth embodiment operates as described above. That is, the actual octane numbers of the low-octane fuel and the high-octane fuel are determined, and then the two fuels are mixed so as to attain a target octane number. Therefore, a fuel having a standard octane number in accordance with the operation state can be obtained even in the case where the octane numbers of the high-octane fuel and the low-octane fuel are unknown, or the octane numbers of the high-octane fuel and the low-octane fuel deviate from their nominal octane numbers.

Next, a sixth embodiment will be described.

Figure 2:
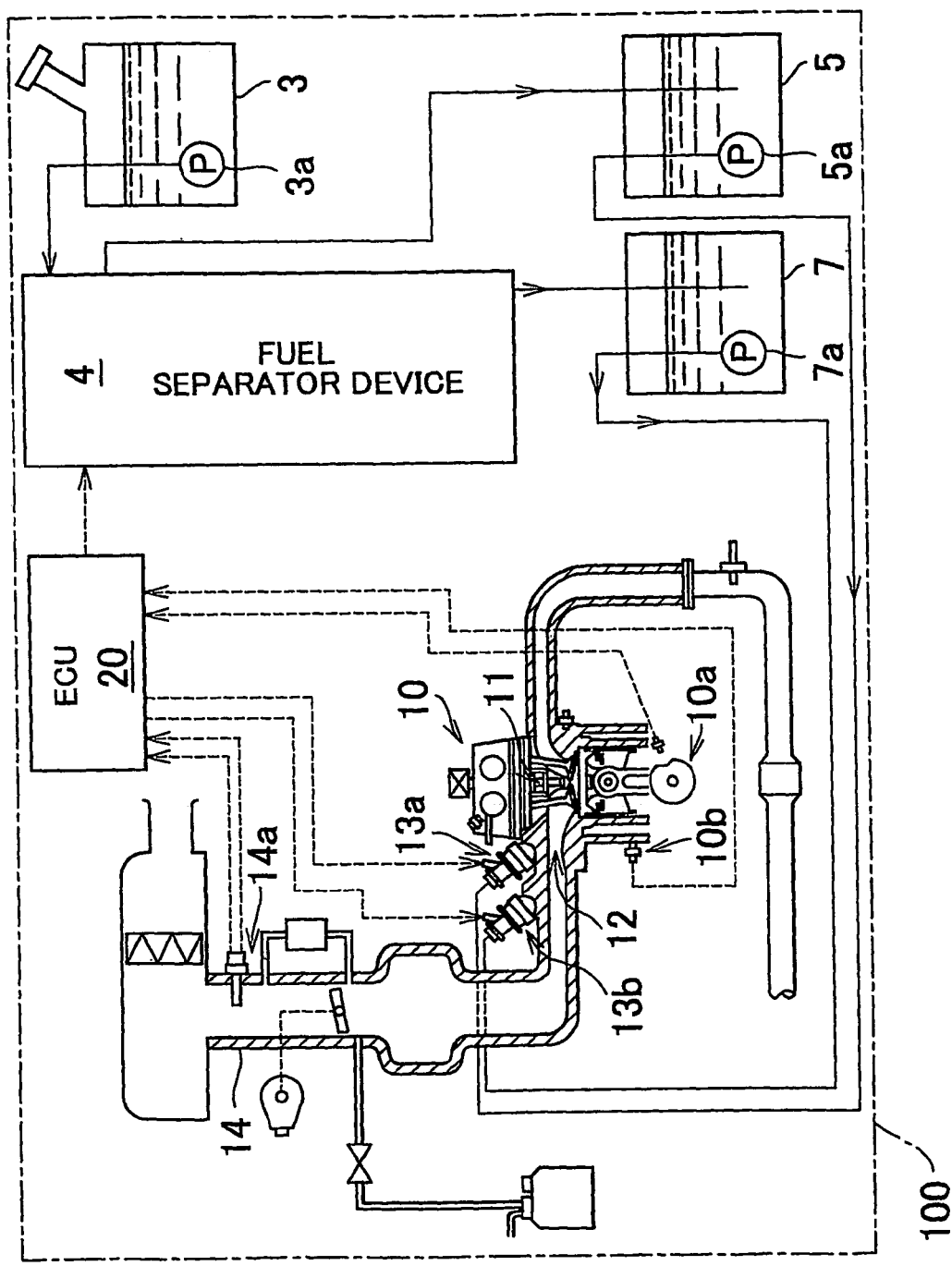
FIG. 2 is a diagram illustrating a construction of a sixth embodiment.

FIG. 2 is a diagram illustrating a structure of the sixth embodiment. In addition to the arrangement of the first to fifth embodiments shown in FIG. 1, the sixth embodiment further include a fuel tank 3 storing a fuel, and a fuel separator device 4 for separating the fuel supplied from the fuel tank 3 via a fuel pump 3a into a high-octane fuel and a low-octane fuel. Although not illustrated in detail, the fuel separator device 4 is equipped with, for example, a separating membrane having a good permeability for aromatic components, and causes the fuel to flow toward the separating membrane, and therefore separates the fuel into a high-octane fuel containing a large amount of aromatic components which passes through the separating membrane, and a low-octane fuel containing a reduced amount of aromatic components which is recovered without passing through the separating membrane.

However, the fuel separator device 4 is not limited to this type of device, but may be of any type of device if the device is able to separate a fuel into a high-octane fuel and a low-octane fuel. For example, the fuel separator device 4 may be of a type in which the separation is accomplished by fractional distillation. In any type, the low-octane fuel and the high-octane fuel separated by the fuel separator device 4 are stored into a low-octane fuel tank 5 and a high-octane fuel tank 7 similar to those of the first and second embodiments.

According to the separating membrane type fuel separator device 4 in the sixth embodiment, a commercially available regular gasoline, having an octane number of about 90, can be separated into a gasoline having an octane number of about 86 and a gasoline having an octane number of about 100 if the separator device normally operates. A commercially available high-octane gasoline, having an octane number of about 100, can be separated by the separator device 4 into a gasoline having an octane number of about 96 and a gasoline having an octane number of about 110.

In the sixth embodiment, therefore, a target octane number of a mixed fuel, the ignition timing and the like are set on the assumption that if a regular gasoline is stored in the fuel tank 3, a low-octane fuel having an octane number of 86 and a high-octane fuel having an octane number of 100 are stored into their respective tanks, and if a high-octane gasoline is stored in the fuel tank 3, a low-octane fuel having an octane number of 96 and a high-octane fuel having an octane number of 110 are stored into their respective tanks. In the sixth embodiment, knocking is avoided during a predetermined steady operation state.

Figure 10:
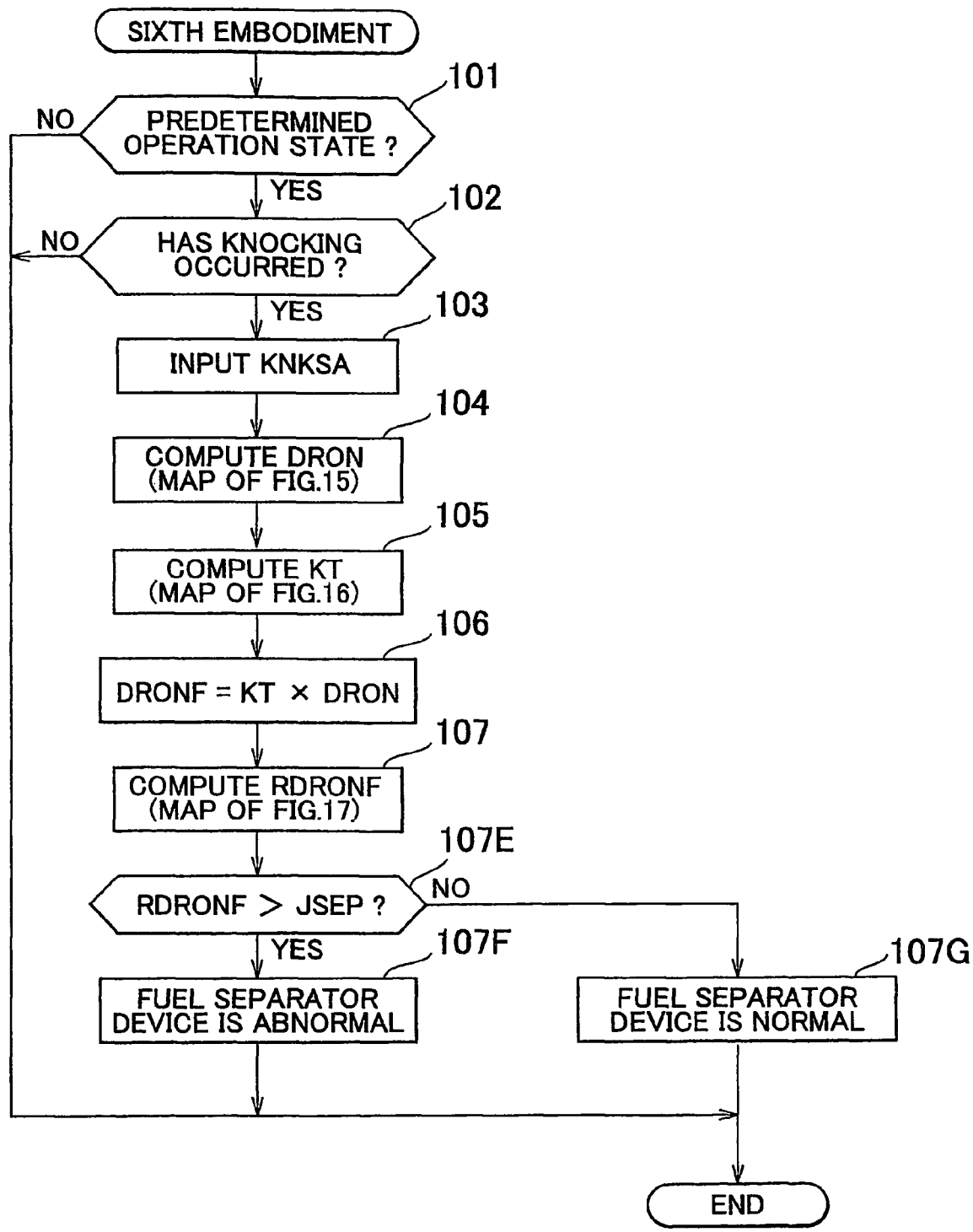
FIG. 10 is a flowchart illustrating a control in the sixth embodiment.

On the aforementioned preconditions, a control illustrated by a flowchart shown in FIG. 10 is executed. Steps 101 to 107 are the same as those in the first embodiment. However, the sixth embodiment is different from the first embodiment in that step 107 is followed by execution of steps 107E to 107C; and steps 108 to 112 are omitted. In step 107E, it is determined whether the RDRONP computed in step 107 is greater than a predetermined criterion value JSEP. If the determination in step 107E is affirmative, it is determined in step 107F that the fuel separator device has abnormality. If the determination in step 107E is negative, it is determined in step 107G that the fuel separator device does not have abnormality. After that, the process ends. If it is determined that the fuel separator device has no abnormality, it is also possible to execute steps 108 to 112 in the first embodiment in order to determine a mixing proportion deviating from the standard mixing proportion due to abnormality in a portion or the like other than the fuel separator device. Since the sixth embodiment operates as described above, it can be determined whether the fuel separator device 4 is normally operating so as to separate a fuel into a high-octane fuel having a predetermined octane number and a low-octane fuel having a predetermined octane number.

The invention claimed is:

1. A spark ignition internal combustion engine, comprising:
   a fuel mixture portion that mixes a high-octane fuel and a low-octane fuel based on a variable mixing proportion, and supplies a mixed fuel into a combustion chamber,
   a first mixing proportion adjusting portion that sets a standard octane number in accordance with an operation state of the spark ignition internal combustion engine, adjusts a mixing proportion between the high-octane fuel and the low-octane fuel so as to achieve the standard octane number, and uses the adjusted mixing proportion as a first mixing proportion;
   a reference ignition timing setting portion that sets a reference ignition timing corresponding to the standard octane number
   a knocking measurement portion that measures a state of occurrence of knocking in an operation state where fuel is injected based on the first mixing proportion and ignition is performed at the reference iginition timing a deviation determination portion that determines a deviation value between an actual mixing proportion between the high-octane fuel and the low-octane fuel really supplied into the combustion chamber and the first mixing proportion, the deviation value being set based on the measured state of occurrence of knocking; and a second mixing proportion estimation portion that estimates a mixing proportion between the high-octane fuel and the low-octane fuel based on the deviation value, and uses the estimated mixing proportion as a second mixing proportion.

2. The spark ignition internal combustion engine according to claim 1, further comprising: a mixing proportion changing portion that, if the second mixing proportion is different from the first mixing proportion, changes an amount of the high-octane fuel and/or an amount of the low-octane fuel supplied into the combustion chamber so that the mixing proportion becomes substantially equal to the first mixing proportion.

3. The spark ignition internal combustion engine according to claim 1, wherein, if knocking does not occur in the operation state where fuel is injected based on the first mixing proportion and ignition is performed at the reference ignition timing, the ignition timing is advanced.

4. The spark ignition internal combustion engine according to claim 1 wherein, if knocking occurs in the operation state where fuel is injected based on the first mixing proportion and ignition is performed at the reference ignition timing, a proportion of the high-octane fuel is increased.

5. The spark ignition internal combustion engine according to claim 1, wherein the knocking measurement portion executes a knock control of retarding the ignition timing in accordance with a strength of knocking when knocking occurs, and the second mixing proportion estimation portion estimates the second mixing proportion based on an amount of retardation of the ignition timing caused by the knock control.

6. The spark ignition internal combustion engine according to claim 5, wherein the amount of retardation of the ignition timing caused by the knock control is corrected by an intake air temperature.

7. The spark ignition internal combustion engine according to claim 1, wherein the fuel mixture portion mixes the high-octane fuel and the low-octane fuel so as to achieve the standard octane number based on a known nominal octane number of the high-octane fuel and a known nominal octane number of the low-octane fuel.

8. The spark ignition internal combustion engine according to claim 1, further comprising an actual octane number detection portion adapted for detecting an actual octane number of the low-octane fuel and an actual octane number of the high-octane fuel, wherein the fuel mixture portion calculates a mixing proportion between the high-octane fuel and the low-octane fuel in accordance with the operation state so as to achieve the standard octane number based on the actual octane number of the high-octane fuel detected by the actual octane number detection portion and the actual octane number of the low-octane fuel detected by the actual octane number detection portion.

9. The spark ignition internal combustion engine according to claim 8, wherein the actual octane number detection portion sets a mixing proportion of the low-octane fuel at 100%; measures the state of occurrence of knocking in an operation state where fuel is injected based on the 100% low-octane fuel mixing proportion and ignition is performed at the reference ignition timing; determines the actual octane number of the low-octane fuel based on the measured state of occurrence of knocking; mixes the low-octane fuel whose actual octane number has been determined with the high-octane fuel at a predetermined proportion; measures the state of occurrence of knocking in an operation state where fuel is injected based on the predetermined proportion and ignition is performed at the reference ignition timing, and determines the actual octane number of the high-octane fuel based on the measured state of occurrence of knocking.

10. The spark ignition internal combustion engine according to claim 1, further comprising a fuel separator device that separates a fuel into the high-octane fuel and the low-octane fuel, wherein the second mixing proportion estimation portion determines whether the fuel separator device is normally operating so as to separate the fuel into the high-octane fuel having a predetermined octane number and the low-octane fuel having a predetermined octane number.

11. The spark ignition internal combustion engine according to claim 10, the second mixing proportion estimation portion determines that an operation of the fuel separator device is abnormal if the deviation value between the second mixing proportion determined based on the state of occurrence of knocking and the first mixing proportion is greater than a predetermined criterion value.

12. The spark ignition internal combustion engine according to claim 1, further comprising a fuel injection device that injects the high-octane fuel and the low-octane fuel based on the first mixing proportion.

13. A method for estimating a mixing proportion between a high-octane fuel and a low-octane fuel which is supplied into a combustion chamber of a spark ignition internal combustion engine, comprising the steps of:

a first step of setting a standard octane number in accordance with an operation state of the spark ignition internal combustion engine;

a second step of adjusting a mixing proportion between the high-octane fuel and the low-octane fuel so as to achieve the standard octane number, and using the adjusted mixing proportion as a first mixing proportion;

a third step of setting a reference ignition timing corresponding to the standard octane number;

a fourth step of measuring a state of occurrence of knocking in an operation state where fuel is injected based on the first mixing proportion and ignition is performed at the reference ignition timing;

a fifth step of determining a deviation value between an actual mixing proportion between the high octane fuel and the low octane fuel really supplied into the combustion chamber and the first mixing proportion, the deviation value being set based on the measured state of occurrence of knocking; and a sixth step of estimating a mixing proportion between the high-octane fuel and the low-octane fuel based on the deviation value, and using the estimated mixing proportion as a second mixing proportion.

14. The method according to claim 13, further comprising a fuel injection step during which high-octane fuel and low-octane fuel are injected based on the first mixing proportion.

\* \* \* \* \*